United States Patent [19]
Becker et al.

[11] Patent Number: 5,016,407
[45] Date of Patent: May 21, 1991

[54] ROBOT CONVEYOR SYSTEM

[75] Inventors: Eberhard Becker, Hagen; Hartwig Sprung; Roland Staggl, both of Wetter, all of Fed. Rep. of Germany

[73] Assignee: Mannesmann Aktiengesellschaft, Düsseldorf, Fed. Rep. of Germany

[21] Appl. No.: 360,843

[22] Filed: Jun. 1, 1989

[30] Foreign Application Priority Data

Jun. 2, 1988 [DE] Fed. Rep. of Germany ....... 3818922

[51] Int. Cl.$^5$ ............................................. E01G 1/08
[52] U.S. Cl. ................................. 52/126.1; 52/127.8; 52/365; 414/749; 901/16
[58] Field of Search ............... 414/749, 751, 752, 753; 901/16; 29/464, 467, 468; 52/40, 127.1, 127.2, 127.6, 127.8, 127.12, 365, 372, 375; 403/403, 382, 205

[56] References Cited

U.S. PATENT DOCUMENTS

| | | | |
|---|---|---|---|
| 1,409,089 | 3/1922 | Fitch | 52/40 |
| 2,345,650 | 4/1944 | Attwood | 52/710 X |
| 4,177,002 | 12/1979 | Motoda et al. | 901/16 X |
| 4,654,957 | 4/1987 | Powell et al. | 29/568 |
| 4,679,297 | 7/1987 | Hansen, Jr. et al. | 29/568 |
| 4,773,523 | 9/1988 | Hansen, Jr. et al. | 198/420 |
| 4,781,517 | 11/1988 | Pearce et al. | 901/16 X |
| 4,802,377 | 2/1989 | Keppler | 74/422 |

FOREIGN PATENT DOCUMENTS

| | | |
|---|---|---|
| 3618075 | 12/1987 | Fed. Rep. of Germany. |
| 3818922 | 12/1989 | Fed. Rep. of Germany. |
| 80530 | 3/1970 | German Democratic Rep.. |

Primary Examiner—Robert J. Spar
Assistant Examiner—Donald W. Underwood
Attorney, Agent, or Firm—Nils H. Ljungman & Associates

[57] ABSTRACT

A robot gantry has longitudinal beams supported by support elements. To fasten the longitudinal beams to the supports, the latter have brackets with binding post holes for binding screws. To make possible the adjustment of the brackets housing the beams, the walls of the supports have holes, which are large enough that the binding screws can move in them by the amount required for adjustment. To adjust the brackets, L-shaped adjusting devices are fastened to the supports by screws. The L-leg of the adjustment apparatus has in the power portion horizontal and vertical holes with nuts for set screws. In the upper portion of the L-leg the adjustment device has a vertical slot for a pendulum set screw which can move in the slot. The pendulum set screw is protected by a nut from unintentional falling out, and extends with its threaded portion into a threaded hole in the bracket.

1 Claim, 5 Drawing Sheets

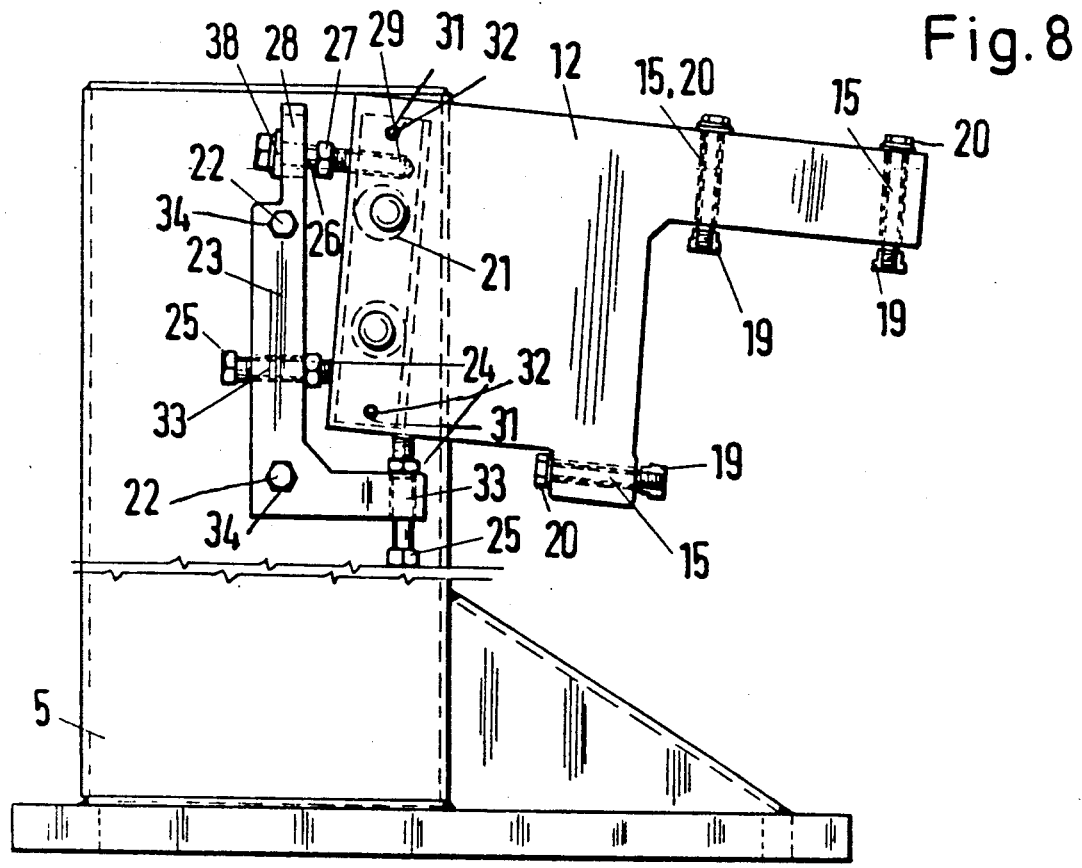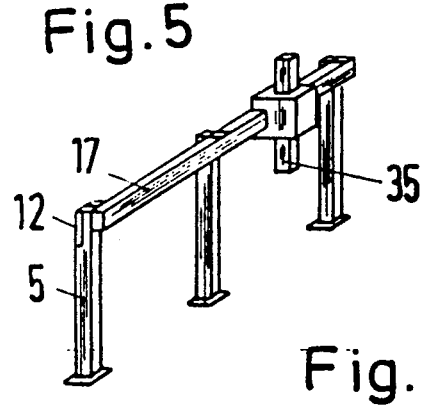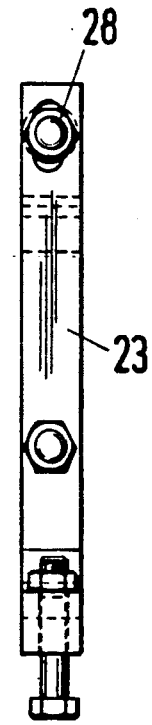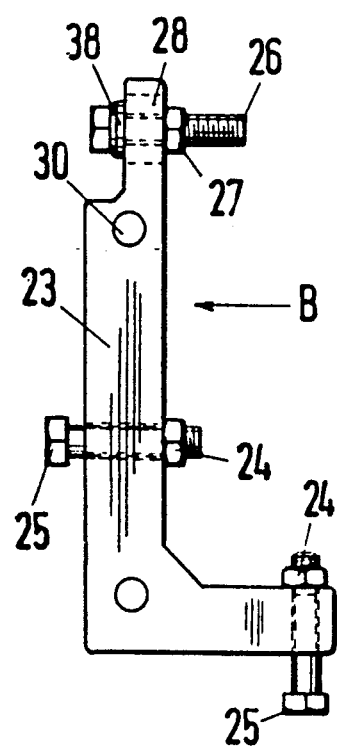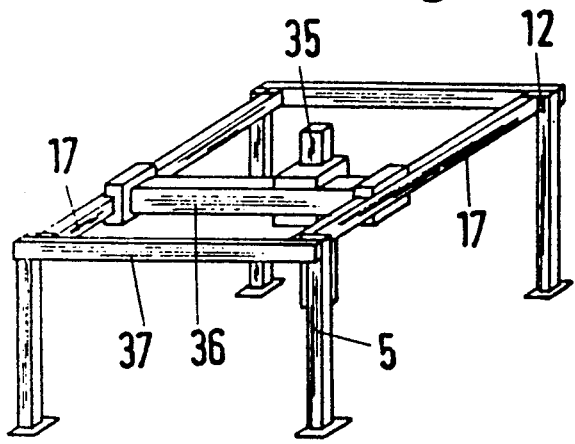

ROBOT CONVEYOR SYSTEM

BACKGROUND OF THE INVENTION

1. Field of the Invention

This invention relates to a robot conveyor system which is supported by a beam which includes a supporting element having brackets positioned on supports which are located next to the beam.

2. Description of the Prior Art

It is known to provide a support wherein a tube is guided through the supports and the beam. This method of bracing, which employs adjustment elements on the base plate of the support, makes possible satisfactory adjustment of the beam in three dimensions. However, the erection process is complex and expensive because it requires at least two persons simultaneously to make the adjustment: one at the base of the support to adjust the support and one near the top of the support to check its position. Grouting must then be poured underneath the base plate of the support after the adjustment has been made.

Further erection of the beams with the elements they support can, normally, be done only once the grouting will support a load. This occurs only after approximately 24 hours have elapsed from the pouring of the grouting. Another disadvantage of this method is that the beam must already be in place before the erection of the supports can be performed.

OBJECT OF THE INVENTION

One object of the invention is, therefore, to design a connection between supports and beams so that the erection process is simplified and the supports can be erected before the installation of the beam.

SUMMARY OF THE INVENTION

This object is achieved in that the brackets are located adjustably next to the supports. The adjustment is performed on perfectly upright supports, so that the erection personnel who are adjusting the brackets can themselves monitor the effect of the adjustments on the beam.

The brackets can be located on the support so that they can be moved in the direction of the y and z axes, and rotated around the axis x, and a movement of the beam or beam/crossbeam frame in the x-direction is possible by means of the clamping grooves of the beam, so that a beam or beam/crossbeam frame can be both moved three-dimensionally and rotated three-dimensionally in relation to the corresponding supports previously connected to the floor, by means of one or more brackets per support.

To facilitate the work, in another configuration of the invention, adjustment devices for the brackets can be attached to the supports. The adjustment devices may, preferably, have at least two binding post holes at some distance from one another for the binding screws inserted through the side walls of the supports. For these, threaded butt straps are in contact with the wall of the support. The holes necessary for the insertion of the screws in the side walls of the supports are larger than the diameter of the binding screws by the maximum possible dimension of the adjustment, so that they do not interfere with the adjustment movement of the brackets. For safety, after the adjustment of the brackets, holes can be drilled through the brackets, the walls of the supports and the butt straps, for the insertion of pins. To fasten the beam, the brackets may have a cantilever boom extending beyond the beam.

If it is necessary to move the beam in relation to the support with the bracket in the longitudinal direction, also, the beam can have clamping grooves for sliding blocks of screws, which extend through holes in the boom or, if it is a side groove, through a downward-pointing bracket strap of the bracket. Preferably, one bracket is located on each side of the support.

In another configuration, the above-mentioned adjustment device can be L-shaped, and be fastened to the support by means of screws. The adjustment device, preferably, has three screws which are in contact with the bracket from below and from the side. One adjusting screw can extend through the lower leg of the L-shaped adjustment device, while another adjusting screw, below, extends horizontally through the vertical leg. The third screw is guided on the upper end through a vertical slot in the leg and can be screwed into a threaded hole in the bracket. This upper screw can have a nut, so that the adjusting screw, which may be fastened loosely in the slot, cannot fall out. A pair of spherical disc washers below the head of the screw prevents it from bending.

It is advisable to cover the box-shaped support on the upper end by means of a cover plate. However, it is also desirable to have a handhole which can be covered by a handhole cover so that the straps, for the guidance of the binding screws for the brackets, can be placed in the appropriate position.

BRIEF DESCRIPTION OF THE DRAWINGS

One embodiment of the invention is described in greater detail below, and is illustrated in the accompanying drawings:

FIG. 4 is a robot gantry which can move longitudinally and transversely, in a perspective view.

FIG. 5 is a robot linear gantry, in a perspective view.

FIG. 8 shows a support like the one in FIG. 6, but with a canted bracket and adjustment apparatus.

FIG. 9 is an enlarged view of the adjustment apparatus illustrated in FIG. 8.

FIG. 10. is a side view of FIG. 9, from direction B.

DESCRIPTION OF THE PREFERRED EMBODIMENTS

Figure 1:
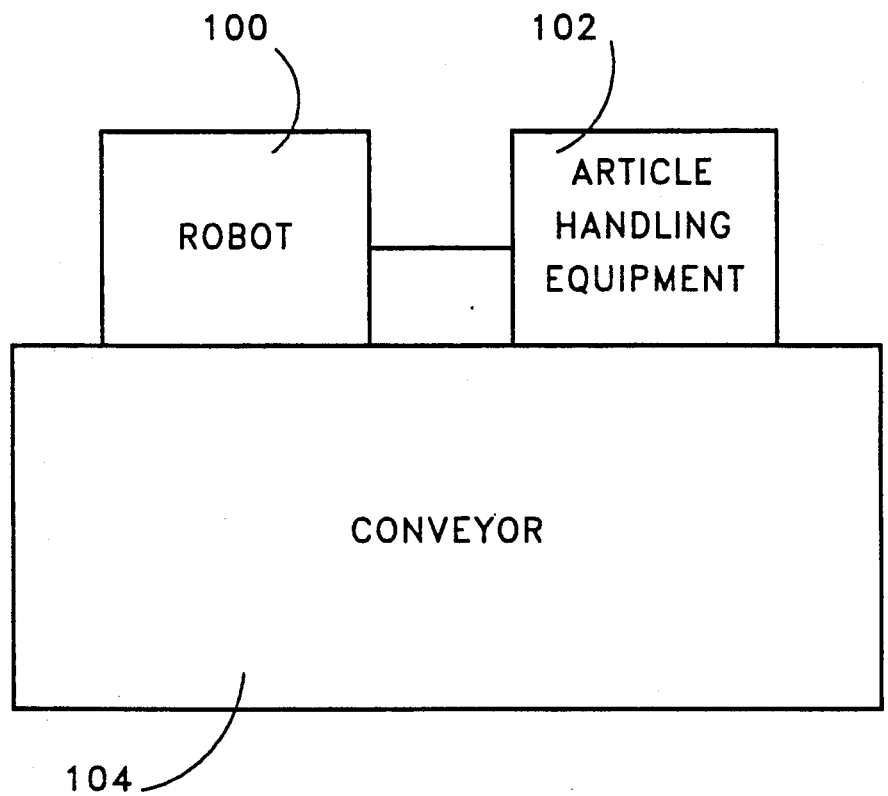
FIG. 1 shows a block diagram of the present invention.
Figure 2:
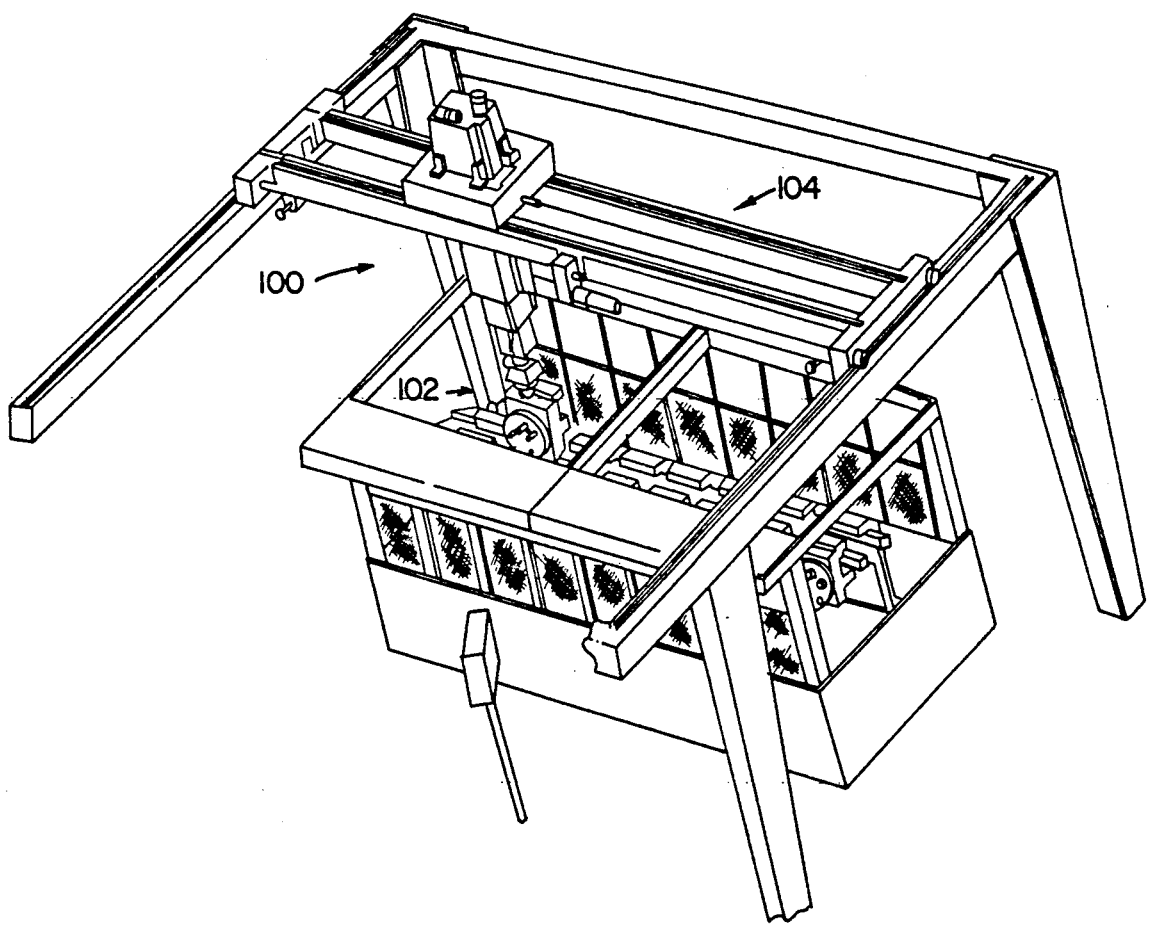
FIG. 2 shows a perspective view of robot article handling equipment and a conveyor.

FIGS. 1 through 10 show the preferred embodiments of the present invention. Robot 100, along with associated article handling equipment 102, is movably supported by conveyor 104.

Floor 1 has dowel holes 2 for receipt of floor bolts 3, which are inserted through base plate 4 of support 5. On the upper end, the handhole provides support 5 and has a cover plate 6 with a handhole (not shown) and handhole cover 7. The handhole provides access to butt straps 8 inside support 5, which consists of a box profile.

Butt strap 8 has two holes, 9, above one another, for receipt of binding screws 11 which attach brackets 12 on both sides of support 5. Nuts 10 hold binding screws 11 in place. Each bracket extends, by means of boom 13, above beam 17 and, by means of bracket strap 14, to the lower edge of beam 17. Beam 17 has clamping grooves 18 for receipt of sliding blocks 19 and screws 20, which are used for fastening beam 17 to boom 13. Also provided are holes 15 for receipt of screws 20, which are employed to fasten beam 17 to bracket strap 14.

Brackets 12 have binding post holes 16 for receipt of binding screws 11 for fastening to supports 5. The walls of supports 5 have holes 21 which, each, are of a diameter large enough to allow binding screws 11 to move inside holes 21 by an amount necessary to effectuate adjustment of brackets 12 and, therefore, beams 17.

Figure 3:
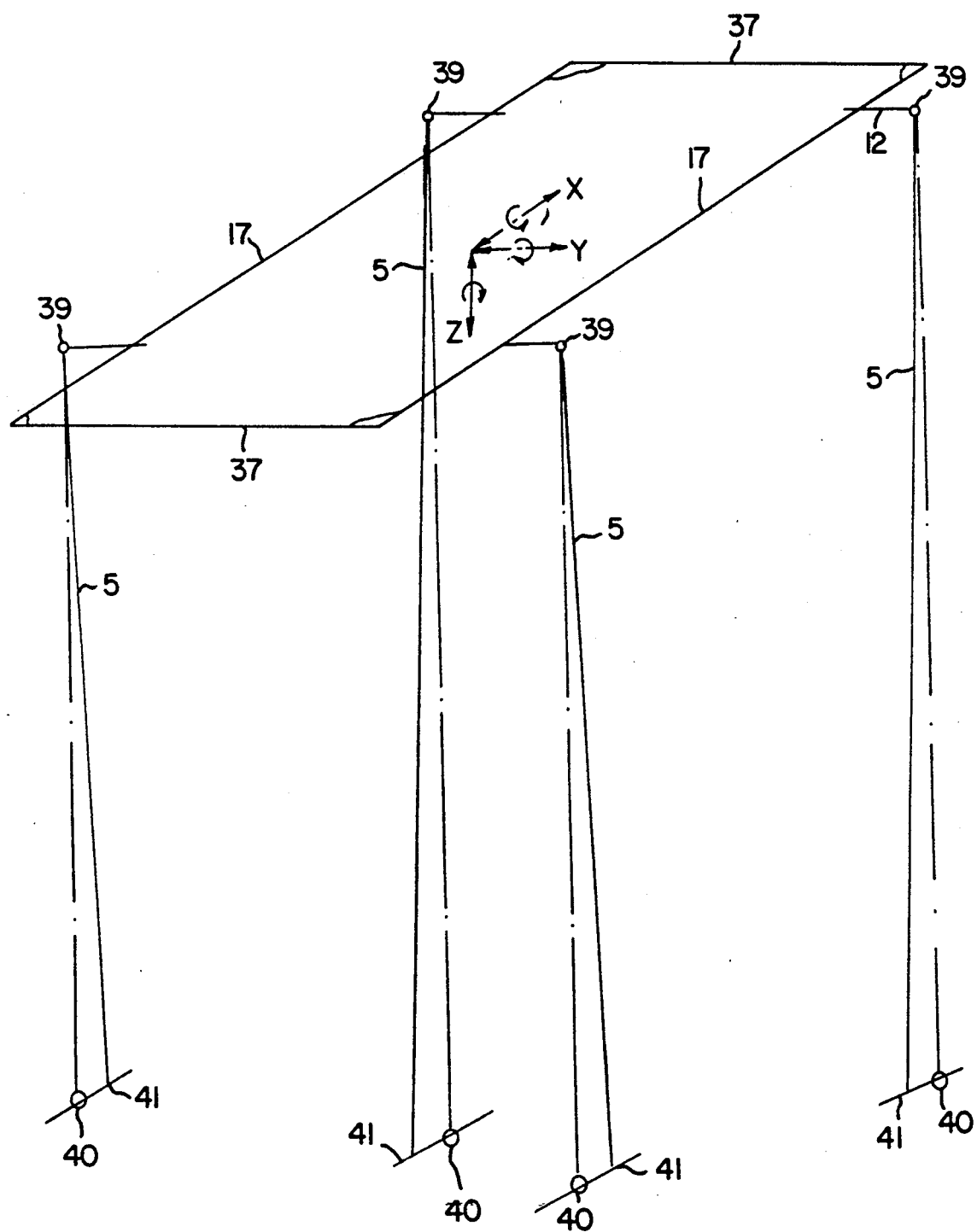
FIG. 3 if a perspective view of a gantry which can move longitudinally and transversely, with the corresponding movement coordinate system.

L-shaped adjustment devices 23 are fastened to supports 5 by means of screws 22 and are used for the adjustment of brackets 12. The embodiment of the invention shown in FIG. 3 is particularly useful in adjusting the angular position of brackets 12 with respect to support 5. Adjustment device 23 has horizontal and vertical holes 33 for receipt of set screws 25 which are held in place by nuts 24. In the upper portion of the L-leg, adjustment device 23 has vertical slot 28 for receipt of pendulum set screw 26, which can move in slot 28. Pendulum set screw 26 is secured by nut 27 to prevent set screw 26 from unintentionally falling out of slot 28. Pendulum set screw 26 has a threaded portion which extends into threaded hole 29 in bracket 12. A pair of spherical disc washers 38 are positioned between the head of pendulum set screw 26 and adjustment apparatus 23 to allow for the necessary angular adjustment of brackets 12.

Figure 6:
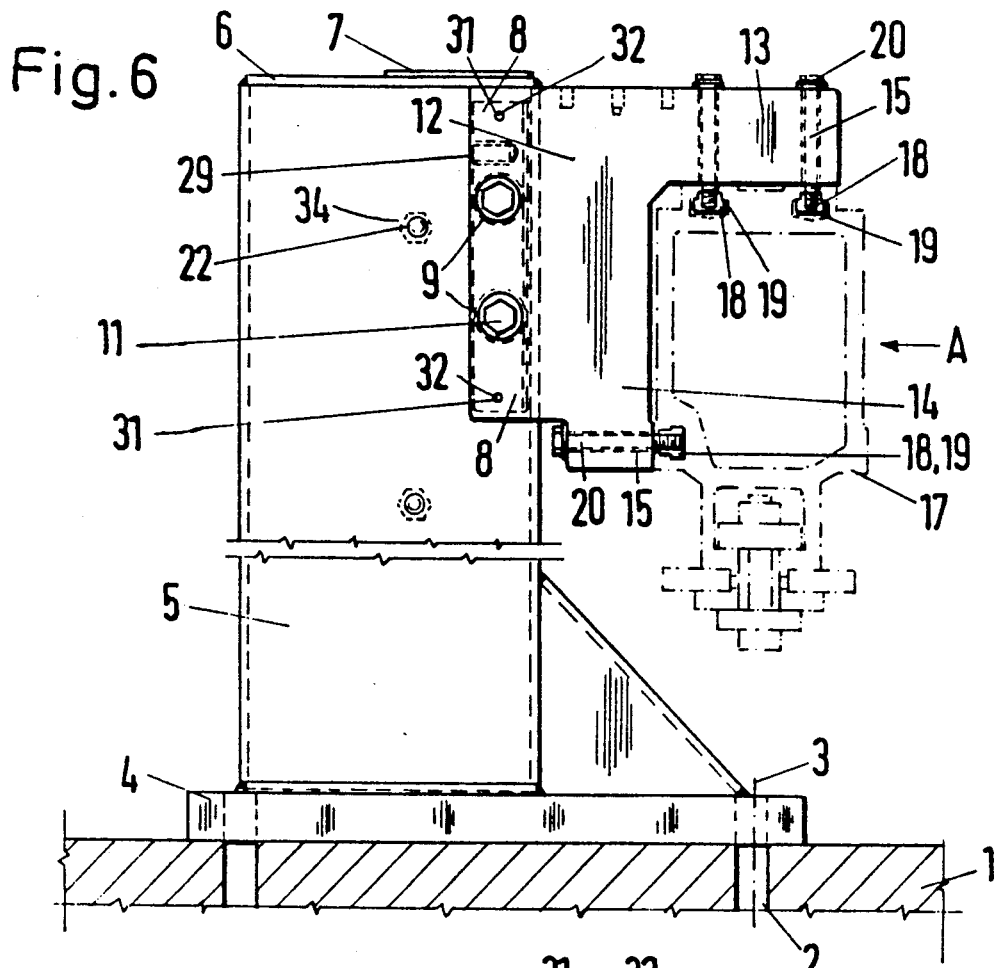
FIG. 6 shows a support with bracket and an end view of a schematically illustrated beam.
Figure 7:
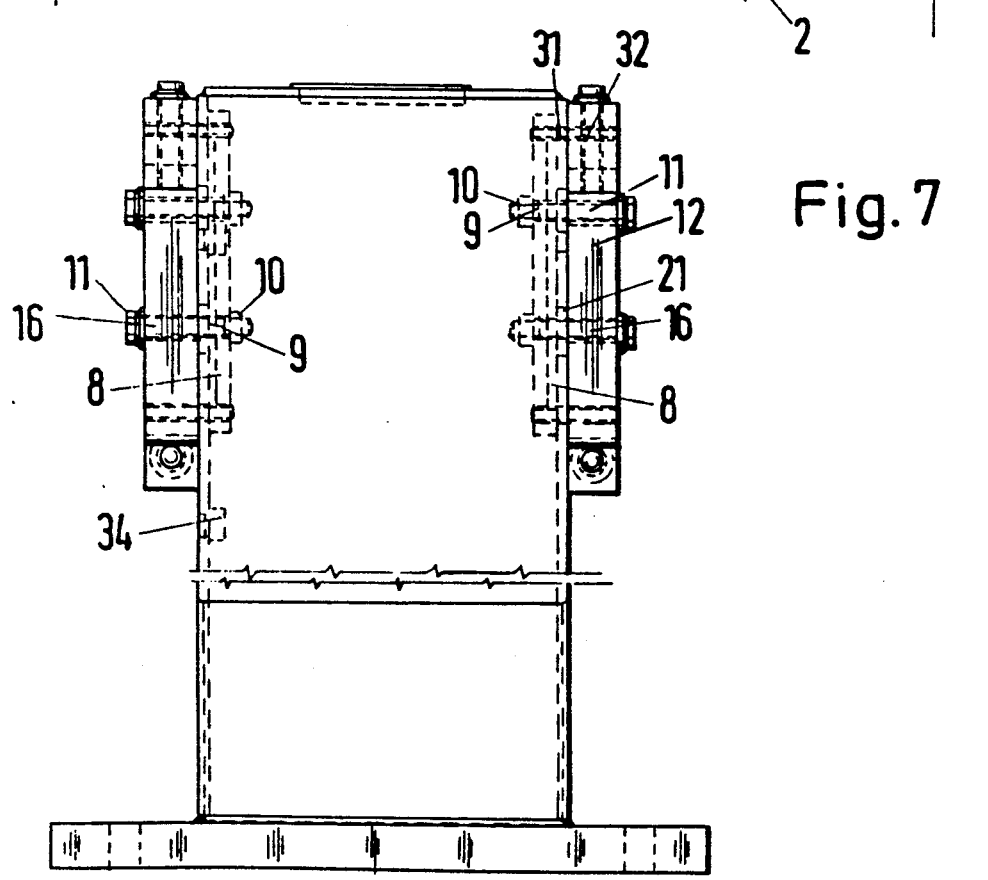
FIG. 7 shows the side view of FIG. 6 from direction A.

After the adjustment of beam 17, of the linear gantry shown in FIG. 5, by means of brackets 12 which are on supports 5, or adjustment of all of beams 17 of a gantry, with crossbeams 37, which moves longitudinally and transversely as shown in FIG. 4, binding screws 11 are then tightened. For safety, small pinholes 31, for receipt of thin pins 32, can be drilled by hand through brackets 12, the walls of supports 5 and straps 8 located inside the supports as shown in FIGS. 6 and 8. Then, screws 22 can be unscrewed from threaded holes 34 which are in supports 5, and adjustment devices 23 can be removed and reused in the erection of another gantry.

Beams 17, which are adjusted by brackets 12, form a perfect guide for hoist 35. Hoist 35 may be positioned on crossbeam 36 of a gantry which allows movement of hoist 35 longitudinally and transversely as shown in FIG. 4. Crossbeams 37, of the gantry which moves longitudinally and transversely, are bolted and attached in the factory by means of pins 32 which act as spacer elements between the ends of the beam 17, so that crossbeams 37 can be removed again, after testing, to facilitate shipment of the gantry, and can be returned and then secured by means of retainers, such as pins, to the condition in which they left the factory before the adjustment in relation to the supports, which have already been erected. The beam/crossbeam frame 17/37, which is secured and made resistant to bending in this manner, is oriented as a unit between the supports and, after the fastening of brackets 12 by screws 20 and 11, is secured by means of pins 32.

FIG. 3 shows the systematic relationship of the support with the axes x, y and z. When truing support 5, which may not, initially, be straight on account of an uneven floor or base plates which are welded at an angle, all that is necessary is that the upper support ends in each desired connection point 39, each with their respective bracket 12, are at the correct altitude, lateral and angular positions in relation to one another. Then, a reasonable difference between the positions of the desired attachment points 40 and the corresponding actual attachment points 41 is not critical, if the beams, of beam/crossbeam frames 17/37 which were tested beforehand as a rigid unit, can be oriented, fastened and secured at a later point between the pre-erected supports.

An example of another supporting element for a beam may be found in German Laid Open Patent Application No. 36 18 075. An example of another robot conveyor system may be found in U.S. Pat. No. 4,802,377, entitled "Gantry Arrangement for an Industrial Robot". Other examples of robots may be found in U.S. Pat. No. 4,773,523, entitled "Method for Automated Handling of Materials Such as Automotive Parts and System Utilizing Same", U.S. Pat. No. 4,679,297 entitled "Method for Changing the Tooling in a Robot-Based System and System Utilizing Same", and U.S. Pat. No. 4,654,957 entitled "Flexible Machining Apparatus With Single Shank Tool and Multi-Spindle Tool Head Changing and Operating Capabilities". The contents of these patents and patent applications are hereby incorporated by reference as if set forth in their entirety herein.

In summing up, a supporting element for a beam including brackets on supports is located next to the beam. The brackets 12 are located adjustably next to the supports 5. The brackets 12 are located so that they can be moved in the direction of axes y and z, and can be rotated around the axis x on the supports 5. A movement of the beam 17 or beam/crossbeam frame 17, 37 is possible in direction x by the use of the insertion grooves 18 of the beam 17. Adjustment devices 23 for the brackets 12 can be attached to the supports 5. Each bracket 12 has at least one binding post hole 16 for a binding screw 11, for which a butt strap 8 equipped with a thread is in binding contact with the support wall, and that a hole 21 in the side wall of the support 5 is larger than the diameter of the binding screw 11 by the largest possible adjustment dimension. The brackets 12, the walls of the supports 5 and the butt straps 8 have pin holes 31 for the insertion of pins 32. The brackets 12 have booms 13 which extend above the beam 17, on which the longitudinal beam 17 is fastened by screws 20 with sliding blocks 19 inserted in its insertion grooves 18. The brackets 12 have bracket straps 14 pointing downward for at least one screw 20, to which the longitudinal beam 17 is fastened by a sliding block 19 of the screw 20 inserted in its insertion groove 18. There is a bracket 12 on each side of the support 5. The adjustment device 23 is L-shaped, and is fastened to the support 5 by screws 22, and has three set screws 25, 26 in contact with the bracket 12 from one side and from below. One set screw 25 extends through the lower leg of the L-shaped adjustment apparatus 23, another projects horizontally through the vertical leg, and the third set screw 26, as the upper pendulum screw, is guided through a vertical slot 30 in the horizontal leg, and can be screwed into a threaded hole 29 of the bracket 12. The set screws 25 are inserted through nuts 24 fastened to the adjustment device 23, and that the set screw 28 is supported by a pair of spherical disc washers 38 on the adjustment device and is secured by a nut 27. The support 5 is a box profile, and has a cover plate 6 on the top end with a handhole, and that the handhole is covered by a handhole cover 7.

The invention as described hereinabove in the context of a preferred embodiment is not to be taken as limited to all of the provided details thereof, since modifications and variations thereof may be made without departing from the spirit and scope of the invention.

What is claimed is:

1. Support structure for a beam comprising:

support means for supporting the beam;

at least one bracket means for being connected to said support means for connecting the beam to said support means;

each said bracket means being adapted to be moved in the direction of the y and z axes and adapted to be rotated on said support means around the x axis with movement of the beam in the x direction being possible by means of insertion grooves in the beam;

each said bracket means including adjustment means for being attached to said support means;

each said bracket having at least one binding post hole for receipt of a binding screw for binding strap means with a wall of said support means with each said binding post hole being a larger diameter than the diameter of said binding screw;

said bracket means, said wall of said support means and said strap means each defining hole means for receipt of insertion pins for securing said bracket means and said strap means to said wall of said support means;

said bracket means having boom means which extend above the beam and which connect to the beam;

said insertion grooves of the beam having sliding blocks inserted therein;

said bracket means having bracket straps for receipt of a screw which connects the beam to said bracket strap by means of said screw being inserted within said sliding block and said sliding block being inserted within said insertion groove of the beam;

said bracket means including first and second brackets each being on opposite sides of said support means from one another;

said adjustment means being L-shaped and fastened to said support means by screw means with said screw means including three set screws each of which being in contact with said bracket means;

a first of said set screws extending through a lower leg of said L-shaped adjustment means with a second of said set screws projecting horizontally through a vertical leg of said L-shaped adjustment means and a third of said set screws being guided through a vertical slot in said vertical leg;

said set screws each being inserted in nuts and supported by spherical disc washers which are secured by said nuts; and said support having a box profile and a cover plate on a top end with said top end having a handhole which is capable of being covered by a handhole cover.

* * * * *